(12) United States Patent
Räsänen et al.

(10) Patent No.: US 6,795,437 B1
(45) Date of Patent: Sep. 21, 2004

(54) ARRANGEMENT FOR INTERCONNECTING COMMUNICATIONS NETWORKS

(75) Inventors: Juha Räsänen, Espoo (FI); Mikko Ohvo, Numminen (FI); Tommi Turunen, Helsinki (FI)

(73) Assignee: Nokia Corporation, Espoo (FI)

( * ) Notice: Subject to any disclaimer, the term of this patent is extended or adjusted under 35 U.S.C. 154(b) by 226 days.

(21) Appl. No.: 10/110,928

(22) PCT Filed: Oct. 17, 2000

(86) PCT No.: PCT/FI00/00900

§ 371 (c)(1),
(2), (4) Date: Apr. 18, 2002

(87) PCT Pub. No.: WO01/30112

PCT Pub. Date: Apr. 26, 2001

(30) Foreign Application Priority Data

Oct. 18, 1999 (FI) .............................. 19992246

(51) Int. Cl.[7] .............................................. H04L 12/66
(52) U.S. Cl. .................................... 370/395.1; 370/401
(58) Field of Search ................................ 370/252–254, 370/351–356, 465–466, 467, 474, 400–406, 498, 522–526, 395.1–395.63

(56) References Cited

U.S. PATENT DOCUMENTS

| | | | |
|---|---|---|---|
| 5,771,459 A | | 6/1998 | Demery et al. |
| 6,038,609 A | * | 3/2000 | Geulen ........................ 709/250 |
| 6,151,325 A | * | 11/2000 | Hluchyj ...................... 370/398 |
| 6,222,843 B1 | * | 4/2001 | Mauger ...................... 370/397 |
| 6,331,981 B1 | * | 12/2001 | Harth et al. ............. 370/395.1 |
| 6,349,332 B2 | * | 2/2002 | Hayball et al. ............. 709/223 |
| 6,381,246 B1 | * | 4/2002 | Constantinof et al. ...... 370/410 |
| 6,389,011 B2 | * | 5/2002 | Allen et al. ................. 370/356 |
| 6,480,511 B1 | * | 11/2002 | Petty .......................... 370/509 |
| 6,483,837 B1 | * | 11/2002 | Howell et al. ............. 370/395.3 |
| 6,493,346 B1 | * | 12/2002 | Cantwell et al. ........ 370/395.63 |
| 6,556,573 B1 | * | 4/2003 | Kaaresoja ............... 370/395.64 |
| 6,574,224 B1 | * | 6/2003 | Brueckheimer et al. . 370/395.6 |
| 6,643,297 B1 | * | 11/2003 | Sproat et al. ............... 370/498 |

FOREIGN PATENT DOCUMENTS

| | | |
|---|---|---|
| GB | 2 322 516 | 8/1998 |
| WO | WO 96/34504 | 10/1996 |
| WO | WO 97/16007 | 5/1997 |
| WO | WO 99/09774 | 2/1999 |
| WO | WO 99/52307 | 10/1999 |
| WO | WO 00/59261 | 10/2000 |

* cited by examiner

*Primary Examiner*—Douglas Olms
*Assistant Examiner*—Van Nguyen
(74) *Attorney, Agent, or Firm*—Pillsbury Winthrop LLP

(57) ABSTRACT

The invention relates to an interconnection between different types of communications networks. A first core network element is connected to a first access network by means of a first protocol stack used between the first core network element and a network element in the first access network. A second core network element is connected to a second access network by means of a second protocol stack used between the second core network element and a network element in the second access network. The first core network element is arranged to support and use at least parts of the second protocol stack towards the second core network element, and the second core network element is adapted to extend the parts of the second protocol stack towards the first core network element.

10 Claims, 1 Drawing Sheet

ARRANGEMENT FOR INTERCONNECTING COMMUNICATIONS NETWORKS

FIELD OF THE INVENTION

The invention relates to an interconnection between different types of communications networks.

BACKGROUND OF THE INVENTION

Mobile communication systems generally refer to different telecommunication systems which enable personal wireless data transmission while subscribers roam in the system area. A typical mobile communication system is a Public Land Mobile Network (PLMN). First-generation mobile communication systems were analogue systems where speech or data was transferred in an analogue form similarly as in conventional public switched telephone networks. An example of a first-generation system is the Nordic Mobile Telephone (NMT). In second-generation mobile systems, such as the Global System for Mobile Communication (GSM), speech and data are transmitted in a digital form. In addition to conventional speech transmission, digital mobile communication systems provide a plurality of other services: short messages, facsimile, data transmission, etc.

Currently under development are third-generation mobile communication systems, such as the Universal Mobile Communication System (UMTS) and the Future Public Land Mobile Telecommunication System (FPLMTS), which was later renamed as the International Mobile Telecommunication 2000 (IMT-2000). The UMTS is being standardized by the European Telecommunication Standards Institute (ETSI), whereas the International Telecommunication Union (ITU) standardizes the IMT-2000 system. These future systems are basically very similar. For example the UMTS, as all mobile communication systems, provides wireless data transmission services to mobile subscribers. The system supports roaming, which means that UMTS users can be reached and they can make calls anywhere as long as they are situated within the coverage area of the UMTS.

Transition to the use of third-generation mobile communication systems will take place gradually. At first, third-generation radio access networks will be used in connection with the network infrastructure of second-generation mobile communication systems. Such a hybrid system is illustrated in FIG. 1. A second-generation mobile services switching centre MSC is connected both to a second-generation radio access network, such as a GSM base station system BSS consisting of a base station controller BSC and base stations BTS, and to a third-generation radio access network consisting of, for example, a radio network controller RNC and base stations BS. In practice, there will be two different radio subsystems RSS, which share a common infrastructure on the network subsystem NSS level. Second-generation mobile stations MS (such as the GSM) communicate via the second-generation radio access network and third-generation mobile stations MS (such as the UMTS) communicate via the third-generation radio access network. Possible dual-mode phones (such as GSM/UMTS) are able to use either radio access network and to perform handovers between them. Subsequent development will lead to a situation where pure third-generation mobile communication networks exist in parallel with second-generation mobile systems or the aforementioned hybrid systems, as also illustrated in FIG. 1.

The interface between the 2G RAN (e.g. GSM BSS) and the 2G MSC (e.g. GSM MSC) is interface A, in which the transport/physical layer is a 64 kbits/s time division multiplexed (TDM) transmission channel, i.e. a PCM channel. The maximum data rate for a single traffic channel (one time slot) on the air interface is 9,6 kbits/s or 14,4 kbitls. In the HSCSD concept of the GSM system, a high-speed data signal is divided into separate data streams, which are then transmitted via N subchannels (N traffic channel time slots) at the radio interface. When the data streams have been divided, they are conveyed in the subchannels or substreams as if they were mutually independent until they are again combined in the IWF or the MS. However, logically these N subchannels or substreams belong to the same HSCSD connection, i.e. they form one HSCSD traffic channel. In the HSCSD concept the N subchannels are extended also over interface A up to the MSC.

In the UMTS architecture, the UMTS terrestrial radio access network, UTRAN, consists of a set of radio access networks RAN (also called radio network subsystem RNS) connected to the third generation (3G) MSC (or more generally, to a core network CN) through the interface Iu. Each RAN is responsible for the resources of its set of cells. For each connection between a mobile station MS and the UTRAN, one RAN is a serving RAN. A RAN consists of a radio network controller RNC and a multiplicity of base stations BS. The RNC is responsible for the handover decisions that require signaling to the MS. The base stations are connected to the RNC through the Iub interface.

On the interface Iu between the radio network controller RNC and the mobile switching centre MSC or the IWU, the transfer technique is the ATM (A synchronous Transfer Mode). The ATM transmission technique is a switching and multiplexing solution particularly relating to a data link layer (i.e. OSI layer 2, hereinafter referred to as an ATM layer. In the ATM data transmission, the end user's data traffic is carried from a source to a destination through virtual connections. Data is transferred over switches of the network in standard-size packets called ATM cells. The ATM cell comprises a header, the main object of which is to identify a connection number for a sequence of cells forming a virtual channel for a particular call. A physical layer (i.e. OSI layer 1) may comprise several virtual paths multiplexed in the ATM layer. The ATM layer contains an ATM adaptation layer (ML) which enhances the service provided by the ATM layer to support functions required by the next highest layer. The AAL performs functions required by the user, control and management planes and supports the mapping between the ATM layer and the next higher layer. The functions performed in the AAL depend upon the higher layer requirements. At the moment, there are three different types of AAL: type 1 AAL (AAL1), type 2 AAL (AAL2) and type 5 AAL (AAL5).

The data rate at the UMTS air interface may be up to 2 Mbitls, which means that interface A between the IWU and 2G MSC must use the HSCSD concept in which a number of substreams is formed within each 64 kbits/s TDM channel. The 2G MSC (or more particularly, the associated interworking function IWF) naturally supports this feature, but in the case of the hybrid 2G/3G system, the HSCSD subchannels and protocols have to be implemented in the IWU merely because the standard interface A is required. Similar situation will be encountered on the interface between the 2G MSC and the 3G MSC after an inter-MSC handover. Therefore, in order to reduce the overall complexity, the idea of allowing "modest" changes to the 2G interfaces when connecting them to the 3G network has been silently approved in the standardisation.

One proposed approach is a new protocol, A-TRAU', on the interface between the 2G and 3G MSCs. The A-TRAU' protocol is used on a plain 64 kbitls TDM channel without substreams, and thereby the complex protocol conversion relating to the substreams is avoided. The problem in this prior art approach is that it makes the protocol stacks rather complex by adding a completely new protocol to the 3G network and requiring that the new protocol is supported by the already existing 2G network elements. In other words, the number of different protocols increases. Further, there will still be two separate protocol legs, one (i.e. the Iu interface User Plane protocol, IuUP) on the Iu interface and the other (A-TRAU') on the A interface. Finally, there will be an unnecessary protocol termination in the 3G-MSC in the case of a 2G-to-3G handover.

SUMMARY OF THE INVENTION

An object of the invention is to alleviate the problems described above.

This and other objects and advantages of the invention are achieved by means of communications systems, switching centres and an interworking unit as recited in the attached independent claims. Preferred embodiments on the invention are described in the dependent claims.

A first aspect of the invention is a communication system comprising

- a first core network element connected to a first access network by means of a first access network-specific protocol stack used between said first core network element and a network element in said first access network,
- a second core network node connected to a second access network by means of a second access network-specific protocol stack used between said'second core network element and a network element in said second access network,
- the first core network element being arranged to support at least parts of the second protocol stack,
- the first core network element being arranged to use at least parts of the second protocol stack towards the second core network element, and
- the second core network element being adapted to extend the parts of the second protocol stack towards the first core network element.

According to a preferred embodiment of the invention, an access network-specific user-plane protocol which is already used and specified in the access network (such as 3G mobile communications network) and/or an ATM adaptation layer protocol which is specified and used between the user-plane protocol and an ATM layer in the radio access network is/are used also on the interface between radio access network and a lower generation switching centre (e.g. 2G mobile services switching centre). In other words, the same protocols already specified for another use are reused for interconnection purposes. Even though some changes are needed in the lower generation switching centre so that the reused protocols are supported, the invention avoids the need of a completely new protocol leg and the associated complexity. As the access network protocol(s) is (are) extended, less buffering and protocol conversions are needed. The conversions required due to the HSCSD in the pure interface A of the GSM system, for instance, are totally avoided, since the extended protocols of the 3G system are used instead. In its minimum, the functionality of the interworking can be limited to an ATM-TDM conversion. The number of protocol level buffers will be smaller, which results in smaller transmission delays. Further, as there is a smaller number of protocol legs to be initialized, the link set up will be faster.

Further, the same principle can be used both for interconnecting 2G and 3G MSCs in the case of intersystem handovers and for interconnecting a 3G radio access network (e.g. UTRAN) to an already existing 2G network core (e.g. GSM MSCs). As a result, the number of protocols to be supported in both networks is kept to a minimum, thus saving both implementation costs and processing (memory) capacity in network elements.

In an embodiment of the invention, only the access network-specific user-layer protocol is extended to the lower generation switching centre without the underlying ATM adaptation layer. In that case, the only protocol data units of the access network-specific user-layer protocol are mapped directly to the TDM transport layer channel. This reduces the overhead as the frame headers of the ATM adaptation layer are omitted.

According to another embodiment, in the case of a transparent data transmission, the switching centre is arranged to support only the ATM adaptation layer protocol on the interface between the radio access network and the lower generation switching centre. Only the ATM adaptation layer will be extended to the older generation switching centre by the interworking unit or switching center in the new generation network. The access network-specific user-plane protocol layer is in a mode wherein the user data is transparently transferred across the user-plane protocol layer between the ATM adaptation layer and upper layers. Therefore, the ATM adaptation layer PDUs can be relayed from the access network to the older generation switching centre over the TDM-type connection, and vice versa. The access network-specific user-plane protocol is terminated in the interworking unit or in the new generation switching centre. Also in this case unnecessary overhead is avoided.

According a still further embodiment of the invention, a frame synchronization of the new interface is performed by searching at least one control field having a constant value in a header of the protocol data unit received over the interface. The frame synchronization may be further assured by counting a check sum over the header and/or payload of the received protocol data unit and comparing the counted checksum with a respective checksum received in said respective protocol data unit.

The actual user data rate may be lower than the nominal data rate of the TDM channel(s). In such a case, rate adaptation may be performed between a lower user data rate and a higher nominal data rate of said interface by sending protocol data units with fill, sending protocol data units with data and fill, or sending protocol data units with repetition of data, and discarding the fill or repetition on a receiving side.

BRIEF DESCRIPTION OF THE DRAWINGS

The invention will be described below in greater detail in connection with preferred embodiments and with reference to the accompanying drawings, in which.

PREFERRED EMBODIMENTS OF THE INVENTION

The present invention can be applied to any telecommunication system for interconnecting two communications networks of different types or generations, or for interconnecting an access network to a switching centre of a different generation. The access networks may include, for example, Local Area Networks (LANs) or wideband LANs (WLANs). The primary field of application of the invention is an interconnection between a second-generation and a third-generation mobile networks, such as the GSM and the UMTS, and the interconnection of a third generation radio access network to a second-generation mobile services switching centre. In the following, the preferred embodiments of the invention will be described by using the second-generation GSM system and the third-generation UMTS as an example.

Services provided by mobile communication systems can generally be divided into teleservices and bearer services. A bearer service is a telecommunication service which forms signal transmission between user-network interfaces. Bearer services are usually divided into groups according to a property, such as asynchronous and synchronous bearer services. Each of these groups comprises a number of bearer services, such as a transparent service (T) and a non-transparent service (NT). In a transparent service, the (real-time) data to be transmitted is unstructured and transmission errors are corrected only by means of channel coding. In a non-transparent service, the (non-real-time) data to be transmitted is structured into protocol data units (PDU) and transmission errors are corrected by utilizing (in addition to channel coding) automatic retransmission protocols, i.e. retransmission of corrupted data in the data link layer. For example in the GSM system, such a link protocol is called a radio link protocol (RLP). This kind of link protocol is also generally referred to as link access control (LAC), particularly in connection with third-generation mobile communication systems.

Figure 2A:
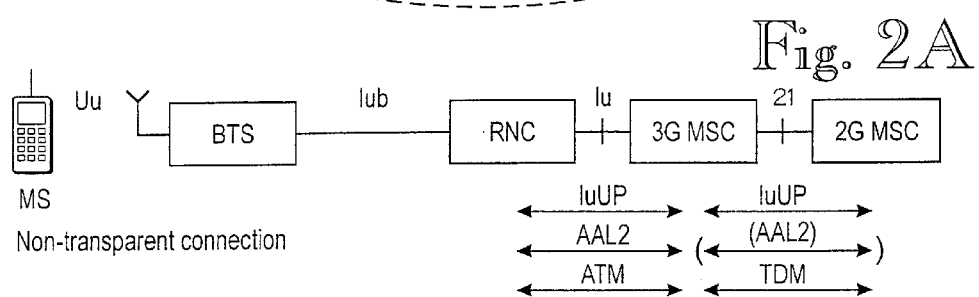
FIGS. 2A and 2B illustrate the interconnection between a third-generation and a second-generation mobile services switching centres for non-transparent and transparent connections, respectively, in accordance with the invention.

The basic concepts of the present invention are illustrated in FIGS. 2A, 2B, 3A and 3B. In FIG. 2A, the 3G mobile communications network comprises the radio access network (RAN), such as the UMTS terrestrial radio access network, UTRAN. The radio access network consists of a radio network controller RNC and a multiplicity of base stations BTS. The RNC is connected to the base stations through the Iub interface. The base station BTS communicates with the mobile stations MS (or user equipment UE) over the radio interface Uu. The Uu and Iub interfaces are not relevant to the present invention and will not be described in more detail herein. Further information can be found in the UMTS specifications.

The RNC is further connected to the third generation (3G MSC) or more generally, to a core network CN through the interface Iu. In the interface Iu the transfer technique is the ATM. The ATM based transport network layer contains an ATM adaptation layer (AAL) which enhances the service provided by the ATM layer to support functions required by the next highest layer. In the embodiment of FIG. 2 the AAL layer is the type 2 AAL (AAL2). The next highest protocol layer on top of the AAL2 is the Iu user plane (UP) protocol, or IuUP. More particularly, the IuUP protocol is located on the user plane of the radio network layer over the Iu interface: the IuUP protocol layer. The IuUP protocol is used to convey user data associated to radio access bearers (e.g. traffic channels on the air interface). In other words, whenever a radio access bearer requires transfer of user data in the IuUP, an IuUP protocol instance exists at each Iu interface access point, i.e. at the RNC and the 3G-MSC. These IuUP protocol instances are established, relocated and released together with the associated radio access bearer. Whether these bearer protocol instances perform some radio access bearer related functions depends on the mode of operation of the IuUP, as will be explained below. There are three modes of operation of the IuUP protocol: 1) transparent mode, 2) support mode for predetermined SDU sizes, and 3) support mode for variable SDU sizes. Determination of the mode of operation is an MSC decision taken at the establishment of the radio access bearer.

The transparent mode is intended for those radio access bearers that require no particular feature from the IuUP protocol other than transfer of user data. In this mode, the IuUP protocol instance does not perform any IuUP protocol information exchanges with its bearer over the Iu interface: no Iu frame is sent. The IuUP protocol layer in the transparent mode is an empty layer which is crossed through by the protocol data units (PDUs) being exchanged between the upper layers and the transport network layer. No IuUP frames are generated in the transparent mode. The transparent circuit switched data transmission, for instance, can utilize the transparent mode of the IuUP protocol.

Figure 1:
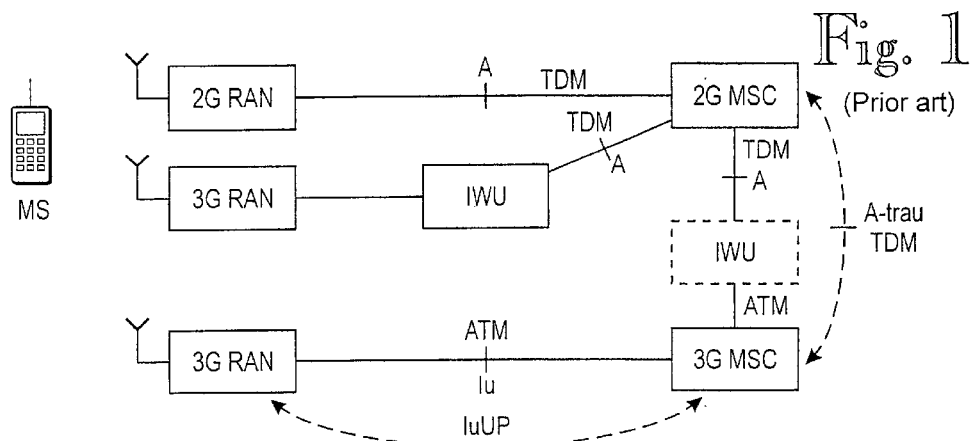
FIG. 1 illustrates a prior art interconnection of a third-generation radio access network and a third-generation mobile communications network to a second-generation mobile services switching centre.

The support modes are intended for those radio access bearers that require some features from the IuUP protocol in addition to the transfer of user data. When operating in the support mode, the peer IuUP protocol instances exchange IuUP frames. The IuUP frame consists of a frame header and payload fields. The frame header may contain various control fields, such as a PDU type, frame number, frame payload checksum, and frame header checksum. The PDU type indicates the structure of the IuUP frame. The IuUP frame numbering is handled by a frame number. The purpose of the frame number is to provide the receiving entity with a mechanism to keep track of lost IuUP frames. The frame header checksum field contains the checksum of all fields in the frame header, except for the frame checksum part. Similarly, the frame payload checksum field contains the checksum of all fields in the frame payload. The payload part contains the user data information coming from the upper layers as payload information. In the prior art approaches, the IuUP protocol is terminated in the 3G-MSC or in the IWU, and the connection to the 2G-MSC will be made over a pure interface A or by means the new A-TRAU' protocol, as shown in FIG. 1. Again referring to FIG. 2A, in accordance to the basic principles of the present invention, the IuUP protocol is extended to span also over the interface 21 between the 3G-MSC and the 2G-MSC. Also the underlying AAL2 protocol layer can be extended to span over the interface 21. However, as AAL2 is not necessarily required when IuUP is used on the interface 21, the AAL2 is preferably terminated at the 3G-MSC if the IuUP is extended. As a result, the frame header overhead can be minimized. The interworking function (IWF) in the 2G-MSC is modified to support the IuUP protocol. The transport network layer is similar to that of interface A, i.e. a time division multiplexed (TDM) channel, e.g. 64 kbit/s channel, or group of channels. The IuUP frames are transferred over the interface 21 in the bits of TDM frames.

As a result, we have IuUP protocol instances at the RNC and the 2G-MSC, and the 3G-MSC relays the IuUP frames from the RNC to the 2G-MSC, and in the opposite direction. Instead of relaying the IuUP frames through the 3G-MSC, the two IuUP legs may also be independent protocol legs.

Figure 2B:
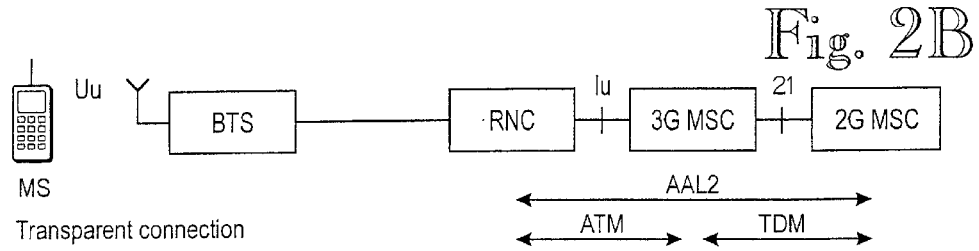

FIG. 2B illustrates the interconnection according to the invention in the case of a transparent circuit switched connection. As described above, the IuUP protocol can be in a transparent mode of operation in the case of the transparent circuit switched transmission. As also explained above, in the transparent mode of operation no IuUP frames are generated and transmitted but the user PDUs are transferred in the AAL2 packets over the Iu interface. In this case, the IuUP protocol is terminated at the 3G-MSC and the AAL2 protocol layer is extended to the 2G-MSC over the interface 21 on top of the TDM transport network layer. The IWF in the 2G-MSC is modified to support the AAL2 protocol. The 3G-MSC forms a single or multiple 56 (RDI) or 64 (UDI) kbit/s stream towards the 2G-MSC, where the call is connected without any other actions concerning the user plane content. Thus, a single protocol leg is needed between the RNC and the 2G-MSC.

Figure 3A:
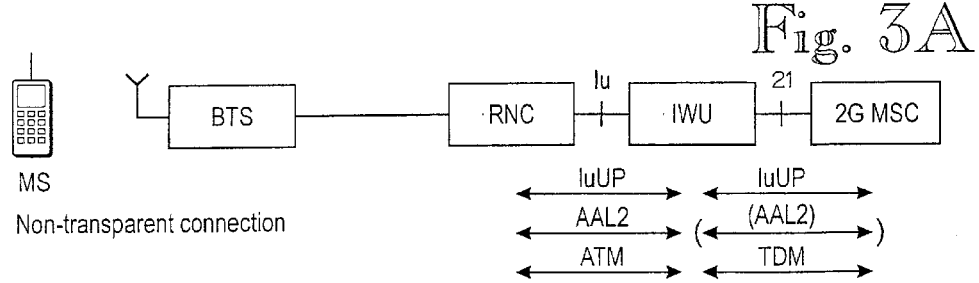
FIGS. 3A and 3B illustrate the interconnection between a third-generation radio access network and a second-generation mobile services switching centre for non-transparent and transparent connections, respectively, in accordance with the invention.
Figure 3B:
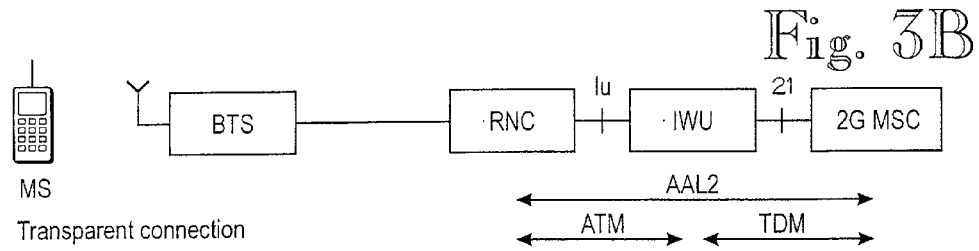

Similarly, the IuUP and AAL2 protocols can be used for connecting the UTRAN to the existing 2G network core i.e. 2G-MSC (as illustrated in FIGS. 3A and 3B respectively). The configuration is similar to that of FIGS. 2A and 2B except that RNC is connected through the Iu interface to an interworking unit (IWU) which is further connected to the 2G-MSC through the interface 21. Regarding to the present invention, the IWU carries out the same functions as the 3G-MSC in FIGS. 3A and 3B. By implementing the UTRAN connection to 2G-MSC with a protocol that has been specified for the 3G network (IuUP and/or AAL2), the functionality of the IWU can be limited to ATM-TDM conversion as far as the circuit switched data user plane protocols are concerned.

As noted above, the IuUP or AAL2 frames are transferred in the TDM bit stream over the interface 21. Before the receiving end can extract the IuUP or AAL2 frames from the received bit stream, it has to carry out the frame synchronization, i.e. to recognize when each specific frame starts or ends. In the following, some examples of frame synchronization methods are given. In the case of non-transparent connection, the radio link protocol (RLP) is typically run on top of the IuUP. In this case, the synchronization can be carried out on the IuUP level. There are several fields with a constant content in the frame header of the IuUP frame. For example, in a circuit switched case, the PDU type field is constant. The synchronization can be obtained by searching the constant field, such as the PDU type, of the IuUP frame (i.e. the known bit patterns) from the received bit stream and simultaneously triggering to the "frame number" field. If the PDU type field and the frame number field are thereafter found in the following frames, and the frame number is incremented in each frame, the frame synchronization has occurred. The frame synchronization may be further ensured by counting the header checksum over the supposed IuUP header and comparing the counted value to the content of the "frame header checksum" field of the received IuUP frame. After the frame synchronization, the payload of the IuUP frame can be extracted and transferred to the upper layers.

In the case of a transparent connection, if the IuUP protocol is used also with the transparent circuit switched data transmission, i.e. when the IuUP is used in one of the support modes, the frame synchronization method can be carried out on the IuUP level in a similar manner to that described above in connection with the case of the non-transparent connection.

However, if the IuUP protocol is used in a transparent mode (i.e. there is no IuUP framing at all) for a transparent connection, the configuration is that shown in FIGS. 2B and 3B. Thus, as AAL2 CPS-packet frames are transmitted over the interface 21, also the frame synchronization has to be carried out on the AAL2 level. The format of the AAL type 2 common part sub-layer (CPS) packet is defined in the ITU-T recommendation 1.363.2:"B-ISDN ATM Adaptation Layer Specification: type 2 AAL". The CPS-packet header includes the following fields: channel identifier (CID), length indicator (LI), user-to-user indication (UUI) and header error control (HEC). The fields CID and UUI have constant values in the case of a circuit switched data connection. Therefore, the frame synchronization can be obtained by searching the received bit stream for the CID and UUI fields (i.e. the known bit patterns). The presence of the frame synchronization may be checked by calculating the HEC checksum and by comparing it to the content of the checksum field of the supposed AAL2 frame. Upon obtaining the frame synchronization, the payload part of the AAL2 can be extracted and transferred to the upper protocol layers.

As noted above, the data rate of the TDM channel on the interface 21 is typically 56 or 64 kbit/s. However, the actual user rate which is transferred through the interface 21 may be significantly smaller. Therefore, some kind of rate adaptation mechanism is needed. In the following, some examples of possible rate adaptation methods are given. The common feature in all methods is that the extra capacity of the TDM channel is used by sending fill data or repetition of data so that the nominal data rate is achieved.

In the case of a non-transparent connection, the rate adaptation to the 64 kbitls TDM time slot can be carried out, for example, by marking the IuUP frame type by sending IuUP frames which contain fill information. The frame type field of the IuUP frame header can be set to indicate that the frame contains fill information and can be discarded at the reception. Alternatively, the rate adaptation can be made on the RLP level by sending Ui (Unnumbered Information) frames (with empty L2R PDUs in the information field) in the payload field of the IuUP. The sending party adds the field frames or Ui frames and the receiving party discards them.

In the case of a transparent connection there are several alternatives for the rate adaptation. Firstly, the AAL2-CPS-packet can be sent without user data, which enables the rate adaptation to the faster connection by padding of unused transmission capacity. The CID or UUI field in the header of the AAL2-CPS packet can be set to indicate that the payload contains "padding".

Secondly, the padding may only take place at some part of the payload of the AAL2-CPS packet (i.e. the whole payload does not need to contain padding). For example, if the user rate is half the nominal rate, one half of the information field of each frame can be filled. The padding may also be a repetition of the user data in the payload. In other words, the same user data may be repeated once or several times in the payload.

Thirdly, it is also possible to use part of the info field of the AAL2-CPS packet, for example the first octet, to indicate whether the whole PDU payload or part of it contains fill data.

It is obvious that as technology advances, the basic idea of the invention can be implemented in several different manners. Therefore, the invention and the embodiments thereof are not restricted to the examples described above, but they may vary within the scope of the claims.

What is claimed is:

1. A communications system, comprising
an access network having an asynchronous transfer mode-type transport network layer, an ATM adaptation layer, and an access network-specific user-plane transmission protocol layer on top of the ATM adaptation layer, a switching center connected to the access network by means of an interface having a time division multiplexed-type transport network layer, an interworking function provided between the access network and the switching center, wherein the switching center being configured to support said access network-specific user-plane protocol and/or a protocol of said ATM adaptation layer on said interface, the interworking function being configured to extend the ATM adaptation layer protocol and/or said user-plane transmission protocol to span between the access network and the switching center over said interface having the TDM-type transport layer.

said interworking function and said switching center are configured to perform initial frame synchronization with protocol data units of said ATM adaptation layer and/or the user-plane transmission protocol layer received over said interface by searching for at least one control field having a constant value in a header of the received protocol data unit, and said interworking function and said switching center are configured to ensure the frame synchronization by counting a checksum over the header and/or payload of said received protocol data unit and comparing the counted checksum with a respective checksum received in said respective protocol data unit.

2. A communications system as claimed in claim 1, wherein said interworking function and said switching center are arranged to perform rate adaptation between a lower user data rate and a higher nominal data rate of said interface by sending protocol data units with fill, sending protocol data units with data and fill, or sending protocol data units with repetition of data, and discarding the fill or repetition on a receiving side.

3. A communications system as claimed in claim 1, wherein, for a non-transparent communication the switching center is configured to support only said access network-specific user-plane transmission protocol on said interface, and the interworking function is configured to relay only said protocol data units of said user-plane transmission protocol between the access network and the switching center over said interface having the TDM-type transport layer.

4. A communications system as claimed in claim 1, wherein, for a bit-transparent communication the switching center is arranged to support only said ATM adaptation layer protocol on said interface, the access network-specific user-plane protocol layer is in a mode wherein the user data is transparently transferred across said user-plane protocol layer between the ATM adaptation layer and upper layers, the interworking function is arranged to be a termination point of the access network-specific user-plane protocol used within the access network, and the interworking function is arranged to relay only said protocol data units of said ATM adaptation layer protocol between the access network and the switching center over said interface having the TDM-type transport layer.

5. A communications system, comprising an access network, a first switching center connected to said access network by a first interface having an asynchronous transfer mode-type transport network layer, an ATM adaptation layer, and an access network-specific user-plane transmission protocol on top of the ATM adaptation layer, second switching center connected to said first switching center by means of a second interface having a time division multiplexed-type transport network layer, the second switching center being configured to support said access network-specific user-plane protocol and/or a protocol of said ATM adaptation layer on said second interface, and the first switching center being arranged to extend the ATM adaptation layer and/or the user-plane transmission protocol to span between the access network and the second switching center over said second interface having the TDM-type transport layer, wherein said first and second switching centers are arranged to perform initial frame synchronization with protocol data units of said ATM adaptation layer and/or the said user-plane transmission protocol layer received over said second interface by searching at least one control field having a constant value in a header of the received protocol data unit, and said first and second switching centers are configured to ensure the frame synchronization by counting a check sum over the header and/or payload of said received protocol data unit and comparing the counted checksum with a respective checksum received in said respective protocol data unit.

6. A communications system as claimed in claim 5, wherein said first and second switching centers are configured to perform rate adaptation between a lower user data rate and a higher nominal data rate of said second interface by sending protocol data units with fill, sending protocol data units with data and fill, or sending protocol data units with repetition of data, and discarding the fill or repetition on a receiving side.

7. A communications system as claimed in claim 5, wherein, for a non-transparent or a transparent communication the second switching center is configured to support only said access network-specific user-plane transmission protocol on said second interface, and the first switching center is configured to relay only said protocol data units of said user-plane transmission protocol between the access network and the second switching center over said second interface having the TDM-type transport layer.

8. A communications system as claimed in claim 5, wherein, for a bit-transparent communication the second switching center is configured to support only said ATM adaptation layer protocol on said second interface, the access network-specific user-plane protocol layer is in a mode wherein the user a data is transparently transferred across said user-plane protocol layer between the ATM adaptation layer and upper layers, the first switching center is configured to be a termination point of the access network-specific user-plane protocol used within the access network, and the first switching center is configured to relay only said protocol data units of said ATM adaptation layer protocol between the access network and the second switching center over said interface having the TDM-type transport layer.

9. An interworking unit for a communications system comprising an access network having an asynchronous transfer mode-type transport network layer, an ATM adaptation layer, and an access network-specific user-plane transmission protocol layer on top of the ATM adaptation layer; and a switching center connected to the radio access network by means of an interface having a time division multiplexed-type transport network layer, wherein said interworking unit is provided on the interface and arranged to extend ATM adaptation layer protocol and/or said user-plane transmission protocol to span between the access network and the switching center over said interface having the TDM-type transport layer, the switching center being arranged to support said access network-specific user-plane protocol and/or a protocol of said ATM adaptation layer on said interfaces said interworking function is configured to perform initial frame synchronization with protocol data units of said ATM adaptation layer and/or the said user-plane transmission protocol layer received over said interface by searching for at least one control field having a constant value in a header of the received protocol data unit, and said interworking function is configured to ensure the frame synchronization by counting a checksum over the header and/or payload of said received protocol data unit and comparing the counted checksum with a respective checksum received in said respective protocol unit.

10. A switching center for a communications system, said switching center being connected to an access network by a first interface having an asynchronous transfer mode-type transport network layer, an ATM adaptation layer, and an access network-specific user-plane transmission protocol on top of the ATM adaptation layer, and to a second switching center by means of a second interface having a time division multiplexed-type transport network layer, wherein said switching center is arranged to extend the ATM adaptation layer and/or the user-plane transmission protocol from the access network to the second switching center over said second interface having the TDM-type transport layer, and the second switching center is arranged to support said access network-specific user-plane protocol and/or a protocol of said ATM adaptation layer on said second interface, said switching center is configured to perform initial frame synchronization with protocol data units of said ATM adaptation layer and/or the said user-plane transmission protocol layer received over said interface by searching for at least one control field having a constant value in a header of the received protocol data unit, and said switching center is configured to ensure the frame synchronization by counting a checksum over the header and/or payload of said received protocol data unit and comparing the counted checksum with a respective checksum received in said respective protocol data unit.

* * * * *